(12) United States Patent
Husslein et al.

(10) Patent No.: US 12,545,316 B2
(45) Date of Patent: Feb. 10, 2026

(54) METHOD FOR TORQUE CONTROL, CONTROL UNIT, AND ELECTROMECHANICALLY ASSISTED STEERING SYSTEM

(71) Applicant: ZF Automotive Germany GmbH, Alfdorf (DE)

(72) Inventors: Dennis Husslein, Düsseldorf (DE); Emad Farshizadeh, Neuss (DE); Torsten Junker, Cologne (DE)

(73) Assignee: ZF Automotive Germany GmbH, Alfdorf (DE)

(*) Notice: Subject to any disclaimer, the term of this patent is extended or adjusted under 35 U.S.C. 154(b) by 777 days.

(21) Appl. No.: 17/896,157

(22) Filed: Aug. 26, 2022

(65) Prior Publication Data

US 2023/0065739 A1  Mar. 2, 2023

(30) Foreign Application Priority Data

Aug. 26, 2021  (DE) .......................... 102021209380.9

(51) Int. Cl.
*B62D 5/04* (2006.01)
*B62D 6/00* (2006.01)

(52) U.S. Cl.
CPC .......... *B62D 5/0463* (2013.01); *B62D 6/008* (2013.01)

(58) Field of Classification Search
CPC .............................. B62D 5/0463; B62D 6/008
See application file for complete search history.

(56) References Cited

FOREIGN PATENT DOCUMENTS

| DE | 60100260 T2 | 2/2004 | |
|---|---|---|---|
| DE | 69930820 T2 | 11/2006 | |
| DE | 102015013241 A1 | 4/2016 | |
| DE | 102019133025 A1 | 6/2021 | |
| KR | 20100058528 A | * 6/2010 | ........... B62D 5/0466 |

* cited by examiner

*Primary Examiner* — Jacob D Knutson
(74) *Attorney, Agent, or Firm* — Kristin L. Murphy

(57) ABSTRACT

A method for torque control for an electromechanically assisted steering system of a motor vehicle is described. The method includes a modified controlled system, detecting at least one measured variable of the controlled system by a sensor, and superimposing a torque demand of the steering feel controller with the inertia compensation torque and/or the damping torque and/or the friction compensation torque.

14 Claims, 4 Drawing Sheets

METHOD FOR TORQUE CONTROL, CONTROL UNIT, AND ELECTROMECHANICALLY ASSISTED STEERING SYSTEM

CROSS-REFERENCE TO RELATED APPLICATION

This application claims priority to European Patent Application No. 102021209380.9, filed Aug. 26, 2021, the disclosure of which is incorporated herein by reference in its entirety.

TECHNICAL FIELD

The disclosure relates to a method for modifying the mechanical behaviour of an electromechanically assisted steering system of a motor vehicle by means of a model-based control approach. The disclosure furthermore relates to a control unit for an electromechanically assisted steering system of a motor vehicle, an electromechanically assisted steering system, and a computer program.

BACKGROUND

Electromechanically assisted steering systems typically have an electric motor, which provides an assistance torque based on one or more variables measured in the steering system. The assistance torque in this case assists the driver when steering the motor vehicle.

The electromechanically assisted steering system typically has a steering feel controller which ascertains the assistance torque based on the measured variable or variables. One particular challenge here is ascertaining the assistance torque so that the torque perceived by the driver at the steering wheel is perceived to be pleasant in all driving situations. For example, the torque perceived at the steering wheel is neither to be excessively high nor excessively low.

However, in typical steering control loops, the tuning of the steering feel controller and thus the influencing of the torque perceptible at the steering wheel is only possible to a limited extent due to mechanical properties of the controlled system, in particular due to mass inertias, rigidities, and friction within the controlled system.

SUMMARY

What is needed is a method for modifying the mechanical behaviour of an electromechanically assisted steering system which enables improved tuning of the steering feel.

A method for modifying the mechanical behaviour of an electromechanically assisted steering system of a motor vehicle is disclosed which uses a model-based control approach. The steering system has an electromechanical steering assistance having an electric motor, a steering feel controller, and at least one modification controller, wherein a torque to be applied by the electric motor is the manipulated variable. A controlled system and the modification controller jointly form a modified controlled system for the steering feel controller. The method comprises the following steps:
  providing a modified controlled system, wherein the modified controlled system imitates desired mechanical properties of a controlled system;
  detecting at least one measured variable of the controlled system by a sensor;
  ascertaining an inertia compensation torque and/or a damping torque and/or a friction compensation torque by the modification controller based on the at least one measured variable;
  generating a torque demand of the steering feel controller for the electric motor by the at least one steering feel controller based on the at least one measured variable; and
  superimposing a torque demand of the steering feel controller with an inertia compensation torque and/or the damping torque and/or the friction compensation torque, by which a modified torque demand for the electric motor is obtained.

Due to the combination of the controlled system and the modification controller, a modified controlled system having modified mechanical properties is obtained, for example having modified mass inertias, modified rigidities, and/or modified friction. The behaviour of the modified controlled system corresponds here to the behaviour of the controlled system, but having the modified mechanical properties.

In particular, the inertia compensation torque causes the modified controlled system to have a reduced mass moment of inertia in relation to the controlled system. The damping torque causes the modified controlled system to have an improved damping characteristic and to have a reduced tendency toward undesired oscillations in relation to the controlled system. The friction compensation torque causes the modified controlled system to have reduced friction in comparison to the controlled system.

The ascertained inertia compensation torque and/or the ascertained damping torque and/or the ascertained friction compensation torque already take into consideration the mechanical properties of the controlled system.

These mechanical properties therefore only still have to be taken into consideration to a reduced extent in the tuning of the torque perceptible at the steering wheel (also referred to hereinafter as steering wheel torque). In particular, the tuning of the steering feel can take place without consideration of these mechanical properties. Improved and simplified tuning of the steering feel by the steering feel controller is thus enabled.

In other words, the method according to the disclosure provides more degrees of freedom in the setting of the steering feel, thus more degrees of freedom in the parameterization of the steering feel controller.

According to one exemplary arrangement of the disclosure, the desired mechanical properties comprise mass inertias, rigidities, and/or friction of the controlled system. Therefore, via the inertia compensation torque and/or the damping torque and/or friction compensation torque, the inertia properties, the damping properties, and/or the friction properties of the controlled system are taken into consideration. In the parameterization of the steering feel controller, these mechanical properties therefore only still have to be taken into consideration to a reduced extent. For example, the tuning of the steering feel can take place without consideration of these mechanical properties.

According to a further exemplary arrangement of the disclosure, the at least one measured variable comprises phase currents of the electric motor, a steering column torque, and/or a motor angle. The air gap torque of the electric motor can be ascertained from the measured phase currents. The air gap torque is in turn a direct measure of the torque provided by the electric motor. The steering column torque can be measured, for example, via a torque sensor. A position of the toothed rack can be ascertained from the measured motor angle.

A further aspect of the disclosure provides that the modification controller comprises a Kalman filter, wherein at least one unknown variable of the controlled system is ascertained by the Kalman filter based on the at least one measured variable, and wherein the inertia compensation torque and/or the damping torque and/or the friction compensation torque is/are ascertained based on the at least one unknown variable. Some variables cannot be measured in the steering system or can only be measured with significant additional expenditure by additional sensors. The Kalman filter calculates the unknown variables based on the at least one measured variable which can be measured using sensors installed in the steering system in any case. In this way, costs for the otherwise required additional measurement sensors are saved.

In a further exemplary arrangement of the disclosure, the unknown variable comprises an acceleration (UDN) of the toothed rack and/or a velocity difference (AQ) between an upper part and the lower part of the steering system and/or a friction force on the lower part of the steering system. The inertia compensation torque can be ascertained based on the acceleration of the toothed rack. The damping torque can be ascertained based on the velocity difference. The friction compensation torque can be ascertained based on the friction force.

In one exemplary arrangement, the Kalman filter is designed based on a mathematical model of the controlled system. In particular, an upper part of the steering system comprising both the steering wheel and a steering column having torsion bar and also a lower part of the steering system of the motor vehicle are modelled by the mathematical model.

According to one exemplary arrangement of the disclosure, the mathematical model is based on a physical equivalent model of the controlled system, for example on a simplified physical equivalent model. Individual sections of the controlled system can each be modeled as a mass having a spring and/or at least one damping in the physical equivalent model, wherein the mass has a predefined moment of inertia in each case. In the simplified physical equivalent model, multiple sections of the controlled system can be combined to form a single section having a combined mass, a combined spring constant, and/or a combined damping.

According to a further exemplary arrangement of the disclosure, an inertia compensation module, a damping module, and/or a friction compensation module is/are designed based on the mathematical model of the controlled system. The inertia compensation module, the damping module, and the friction compensation module allows for the inertia compensation torque, the damping torque, and the friction compensation torque, respectively, to be ascertained. For example, the inertia compensation module, the damping module, and/or the friction compensation module is/are designed based on the physical equivalent model of the controlled system.

A further aspect of the disclosure provides that the inertia compensation torque is ascertained as a product of a linear or nonlinear transmission function and an acceleration ($\dot{v}_{DN}$) of the toothed rack and/or that the damping torque is ascertained as a product of a linear or nonlinear transmission function and a velocity difference ($\Delta\Omega$) between an upper part and the lower part of the steering system and/or that the friction compensation torque is ascertained as a product of a linear or nonlinear transmission function and a friction force on the lower part of the steering system. The linear or nonlinear transmission functions can be selected so that the modified controlled system has desired mechanical properties, for example, desired inertia properties and/or desired damping properties and/or desired friction properties.

The above-described method for modifying the mechanical behaviour of an electromechanically assisted steering system can be applied to any type of steering system. For example, the method according to the disclosure is suitable for an electromechanically assisted steering system having steering column assistance for steering systems in which a torque to be applied is transferred via a pinion, dual pinion, or a belt drive to the toothed rack. Furthermore, the method according to the disclosure is also suitable for steer-by-wire steering systems in which no mechanical operational connection exists between the steering wheel and the wheels.

The disclosure also is directed to a control unit for an electromechanically assisted steering system of a motor vehicle. The electromechanically assisted steering system has an electromechanical steering assistance having an electric motor, a steering feel controller, and at least one modification controller, wherein a torque to be applied by the electric motor is the manipulated variable. A controlled system and the modification controller jointly form a modified controlled system for the steering feel controller. The control unit is designed to carry out an above-described method.

Reference is made to the above explanations with respect to the method in regard to the further advantages and properties of the control unit, which also apply for the control unit and vice versa.

An electromechanically assisted steering system, having an above-described control unit and an electromechanical steering assistance is also disclosed herein. The electromechanical steering assistance has an electric motor, a steering feel controller, and at least one modification controller, wherein a torque to be applied by the electric motor is the manipulated variable. A controlled system and the modification controller jointly form a modified controlled system for the steering feel controller.

Reference is made to the above explanations with respect to the method in regard to the further advantages and properties of the steering system, which also apply for the steering system and vice versa.

A computer program having program code which is designed to cause the above-described steering system to carry out an above-described method when the computer program is executed on a computing unit of the control unit of the steering system is also disclosed.

Reference is made to the above explanations with respect to the method in regard to the further advantages and properties of the computer program, which also apply for the computer program and vice versa.

"Program code" is to be understood here and hereinafter as computer-executable instructions in the form of program code and/or program code modules in compiled and/or in uncompiled form, which can be provided in any programming language and/or in machine language.

BRIEF DESCRIPTION OF DRAWINGS

Further advantages and properties of the result from the following description and the appended drawings, to which reference is made. In the figures.

DETAILED DESCRIPTION

Figure 1A:
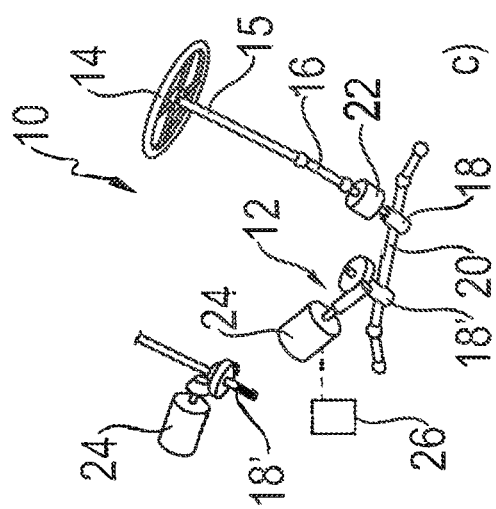
FIGS. 1 (a) to (f) show a schematic diagonal view of different variants of an electromechanically assisted steering system according to the disclosure.

FIG. 1 (a) schematically shows a steering system 10 for a motor vehicle, wherein the steering system 10 has a gearing 12 and is embodied as an electromechanically assisted steering system having steering column assistance ("column drive EPS").

The steering system 10 has a steering wheel 14, which is connected via an upper part of a steering column 15 and via a steering intermediate shaft 16 to a first pinion 18. The first pinion 18 meshes with a toothed rack 20, so that a torque is applied thereto.

A torque and/or steering angle sensor 22 is arranged on the steering column 15, which is designed to measure steering torques and/or a steering angle. For example, it is thus a steering torque and steering angle sensor, which is also referred to in English as a "torque and angle sensor (TAS)" and can provide a steering angle in addition to the steering torque.

Furthermore, an electric motor 24 is provided, which is connected to the gearing 12 in a torque-transmitting manner.

As shown in FIG. 1(a), the gearing 12 can be designed in different ways, for example, as a worm gear, as a spur gear, or as a bevel gear.

In any case, at least one torque, which is provided by the electric motor 24, is transmitted via the gearing 12 to execute a steering movement on the steering intermediate shaft 16.

The electric motor 24 is connected in a signal-transmitting manner to a control unit 26 of the steering system 10, which is only schematically indicated in each of FIGS. 1(a) to (f).

The control unit 26 is designed to ascertain at least one torque to be applied based on measurement data from the steering system 10 and to transmit corresponding control commands to the electric motor 24, so that the electric motor 24 at least provides the torque to be applied.

The control unit 26 is furthermore designed to control, and in one exemplary arrangement, to steer, the motor vehicle at least partially automatically, and in one example, fully automatically. In this case, not only an assistance torque, but rather the complete torque required for controlling or steering the motor vehicle is provided by the electric motor 24.

Figure 1B:
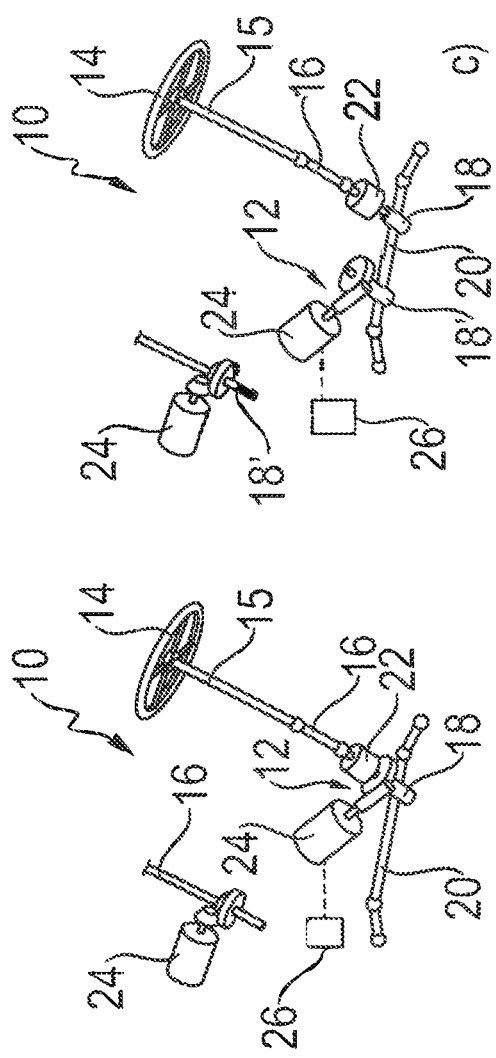

The steering system 10 shown in FIG. 1(b) differs from that shown in FIG. 1(a) in that the electric motor 24 is connected in a torque-transmitting manner via the gearing 12 not to the steering intermediate shaft 16, but rather to the first pinion 18. The steering system 10 thus has a single pinion drive, which is also referred to in English as a "single pinion EPS".

Figure 1C:
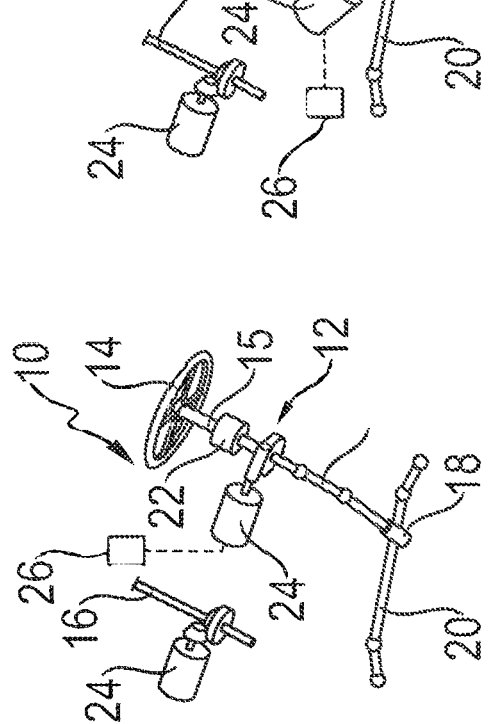

The steering system 10 shown in FIG. 1(c) has a second pinion 18', which is in meshing engagement with the toothed rack 20. The electric motor 24 is connected in a torque-transmitting manner to the second pinion 18' via the gearing 12. The steering system 10 is in this case thus a steering system having dual pinion, which is also referred to in English as a "dual pinion EPS".

Figure 1D:
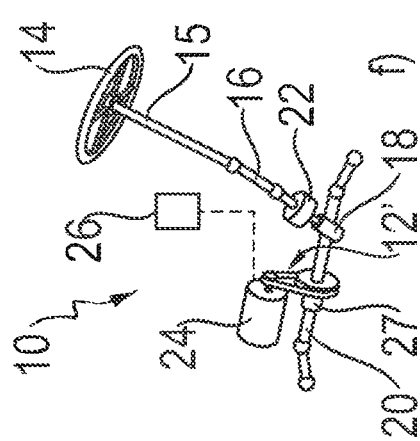
Figure 1E:
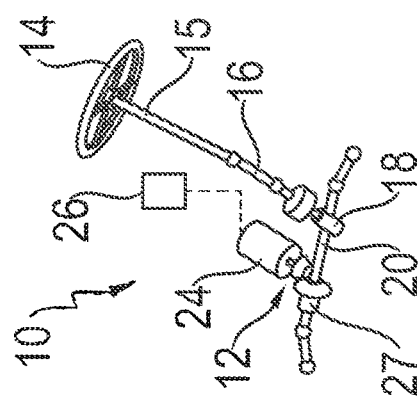
Figure 1F:
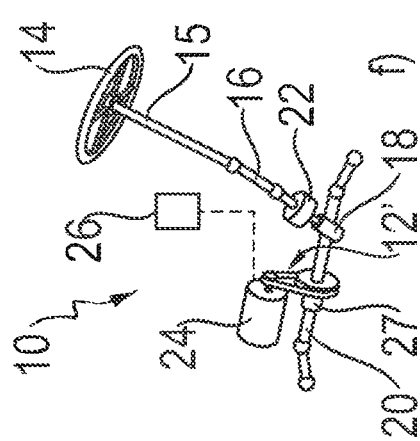

Further possible exemplary arrangements of the electromechanically assisted steering system 10 are shown in FIGS. 1(d) to 1(f).

More precisely, FIG. 1(d) shows a steering system 10 having a concentric toothed rack drive via a recirculating ball nut 27. The electric motor 24 is arranged here directly on the toothed rack 20 and applies the assistance torque to the toothed rack 20 via the recirculating ball nut 27.

FIG. 1(e) shows a drive in which the gearing 12 is designed as a bevel gear, and in which a recirculating ball nut 27 is attached to the toothed rack 20. The electric motor 24 applies the assistance torque to the toothed rack 20 via the gearing 12 and the recirculating ball nut 27.

FIG. 1(f) shows a belt drive 12' having a recirculating ball nut 27 attached to the toothed rack 20. An assistance torque applied by the electric motor 24 is transmitted via a belt of the belt drive 12' to the recirculating ball nut 27 and via this to the toothed rack 20.

Figure 2:
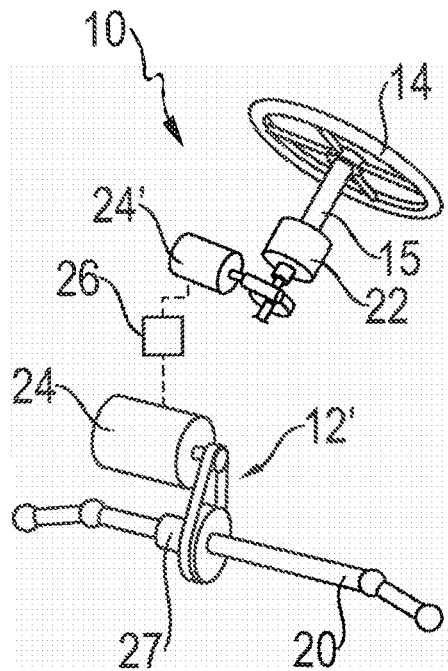
FIG. 2 shows a schematic diagonal view of a steer-by-wire variant of the electromechanically assisted steering system according to the disclosure.

FIG. 2 shows a further exemplary arrangement of the steering system 10. The steering system is designed here as a steer-by-wire steering system, i.e., there is no mechanical operative connection between the steering wheel 14 and the toothed rack 20. Rather, the steering wheel sensor 22 ascertains a steering angle and transmits it to the control unit 26. The control unit 26 activates the electric motor 24, which is connected in the exemplary arrangement shown in FIG. 2 via a belt drive to the toothed rack 20, to generate a torque required for controlling or steering the motor vehicle. In addition, the steering system 10 has a steering wheel actuator 24' here, which can apply a torque to the steering wheel 14, for example, to generate roadway feedback.

However, the electric motor 24 does not have to be connected to the toothed rack 20 via a belt drive. Rather, the electric motor 24 can be connected to the toothed rack via any suitable gearing, for example via a worm drive.

The electromechanically assisted steering system 10 is designed to carry out a method described hereinafter on the basis of FIGS. 3 to 6 for modifying the mechanical behaviour of an electromechanically assisted steering system.

More precisely, the control unit 26 comprises a computer program having a program code, which is designed to cause the steering system 10 to carry out the method described hereinafter for modifying the mechanical behaviour of an electromechanically assisted steering system when the computer program is executed on a computing unit or a processor of the control unit 26 of the steering system 10.

"Program code" is to be understood here and hereinafter as computer-executable instructions in the form of program code and/or program code modules in compiled and/or in uncompiled form which can be provided in any programming language and/or in machine language.

It is to be noted that the method for modifying the mechanical behaviour of an electromechanically assisted steering system is described hereinafter by way of example on the basis of the steering system 10 according to FIG. 1 (f). However, with corresponding adjustments, the method can also be carried out in steering systems 10 according to FIGS. 1 (a) to (e) and according to FIG. 2.

Figure 3:
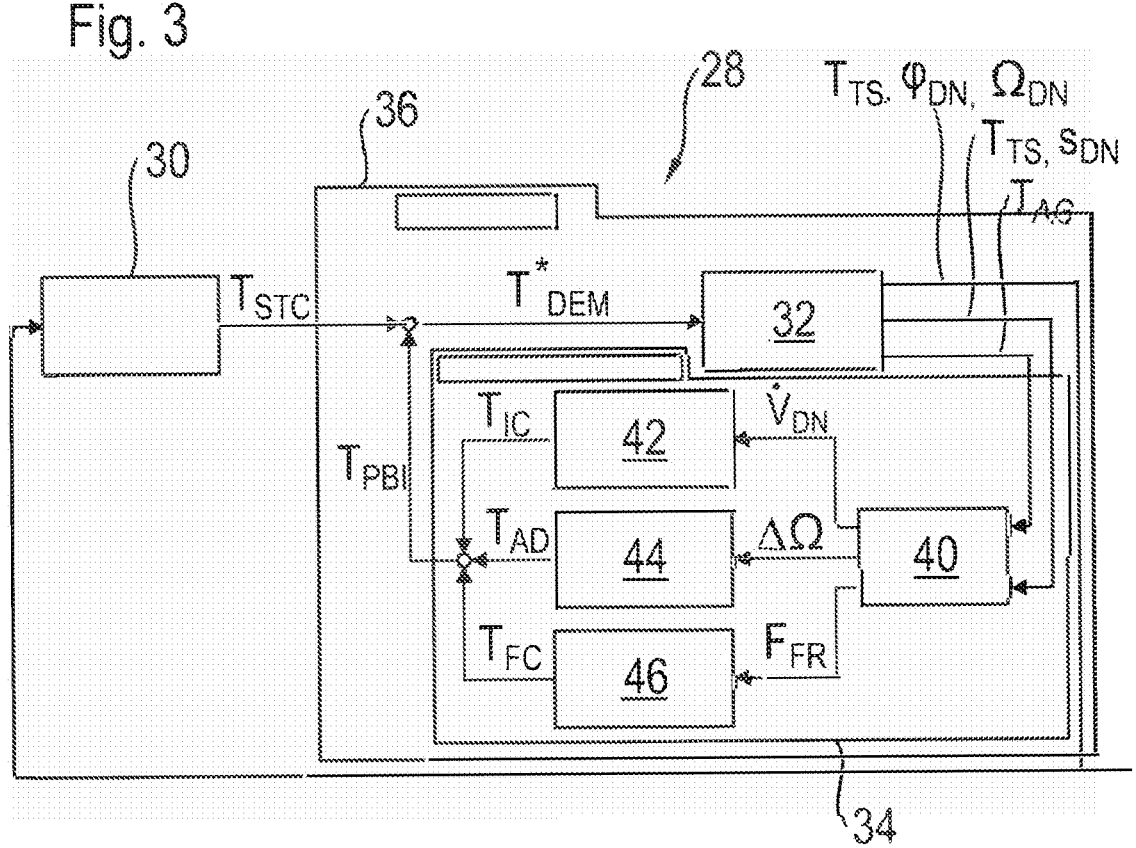
FIG. 3 shows a block diagram of a control loop of the electromechanically assisted steering system of FIG. 1 or 2 having a modification controller and a steering feel controller.

FIG. 3 shows a block diagram of an overall control loop 28, which has a steering feel controller 30, a controlled system 32, and a modification controller 34, wherein the modification controller 34 is used for the method for modifying the mechanical behaviour of an electromechanically assisted steering system.

The controlled system 32 and the modification controller 34 together form a modified controlled system 36 for the steering feel controller 30.

The modification controller 34 has a Kalman filter 40, an inertia compensation module 42, a damping module 44, and a friction compensation module 46.

A physical equivalent model of the controlled system 32 of the steering system 10 is created for the design of the modification controller 34.

Figure 4:
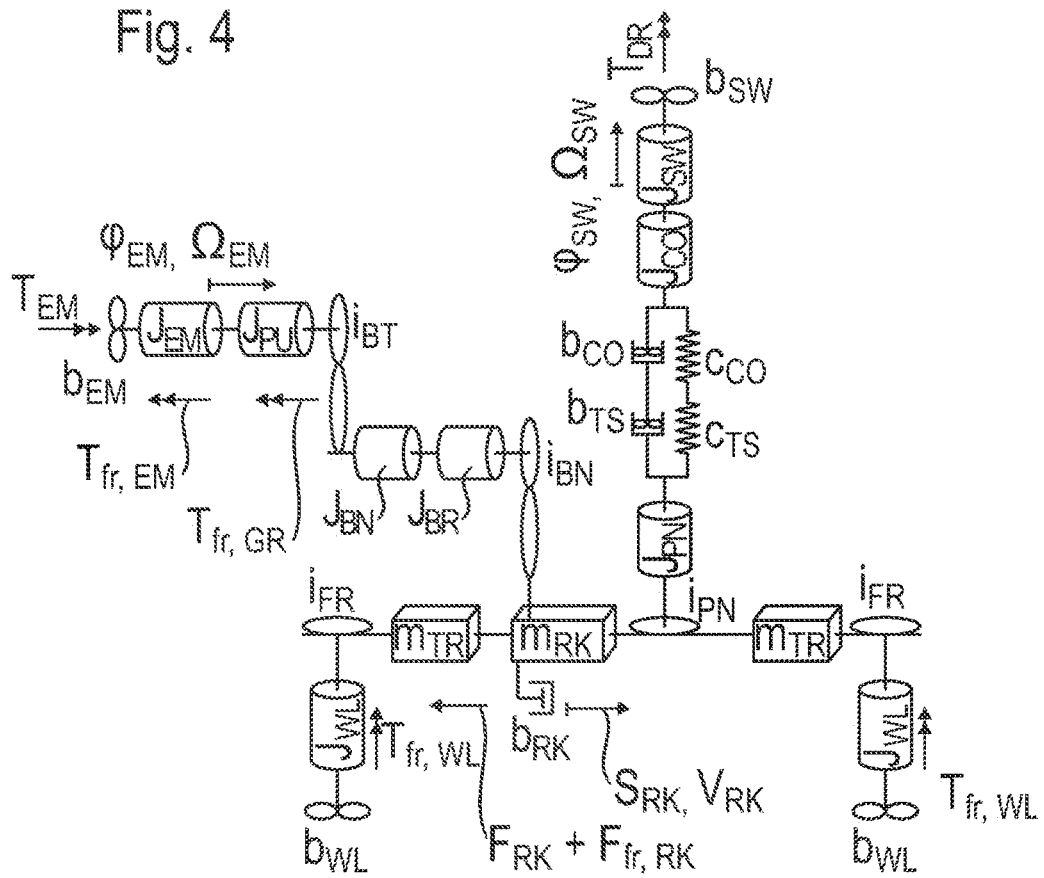
FIG. 4 shows a model of the steering system from FIG. 1 (f)

FIG. 4 shows a first variant of such a physical equivalent model, which simulates the steering system 10 in detail. For the method for modifying the mechanical behaviour of an electromechanically assisted steering system, such a degree of detail is not necessary or results in an elevated demand on computing performance.

Therefore, based on the physical equivalent model of FIG. 4, a simplified physical equivalent model is ascertained which has a reduced complexity.

For an upper part of the steering system 10, which comprises the steering column 15, it is assumed that only the rigidities of the steering column (index "CO" in FIG. 4) and of the torque and/or steering angle sensor 22 (index "TS" in FIG. 4) are relevant.

The moment of inertia $J_{UP}$, the viscous friction $b_{UP}$, the rigidity $c_{TB}$, and the damping $b_{TB}$ of the upper part of the steering system 10 are summarized as follows:

$$J_{UP} = J_{SW} + J_{CO},$$

$$b_{UP} = b_{SW},$$

$$c_{TB} = \frac{c_{CO} c_{TS}}{c_{CO} + c_{TS}},$$

$$b_{TB} = \frac{b_{CO} b_{TS}}{b_{CO} + b_{TS}}.$$

Furthermore, mechanical variables of the lower part of the steering system 10 are simplified according to the following equations:

$$J_{ED} = J_{EM} + J_{PU} + \frac{J_{BN} + J_{BR}}{i_{BT}^2},$$

$$m_{RK,L} = 2\frac{J_{WL}}{i_{FR}^2} + 2m_{TR} + m_{RK} + J_{PN} i_{PN}^2,$$

$$m_{DN} = J_{ED} i_{GR}^2 + m_{RK,L},$$

$$b_{DN} = b_{EM} i_{GR}^2 + 2\frac{b_{WL}}{i_{FR}^2} + b_{RK},$$

$$F_{DN} = (T_{fr,EM} + T_{fr,GR}) i_{GR} + 2\frac{T_{fr,WL}}{i_{FR}} + F_{fr,RK} + F_{RK},$$

$$T_{ED} = T_{EM},$$

$$i_{GR} = i_{BT} i_{BN},$$

$$\Omega_{DN} = i_{PN} v_{DN}.$$

Figure 5:
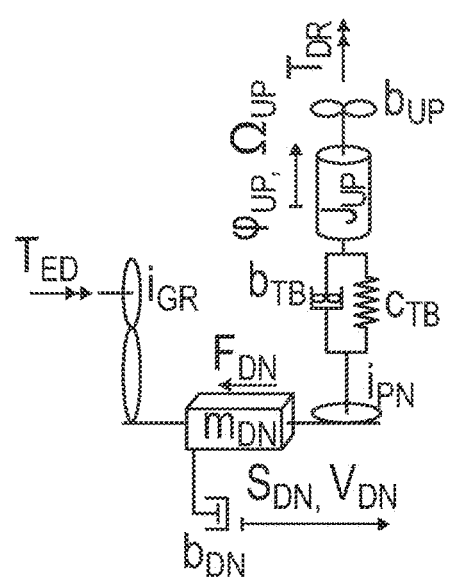
FIG. 5 shows a simplified model of the steering system from FIG. 1 (f)

The above-described simplifications result in a simplified physical equivalent model, which is shown in FIG. 5.

The relevant parameters of this simplified physical equivalent model are, for the lower part of the steering system 10, the combined mass $m_{DN}$ of the lower part of the steering system 10, the combined damping $b_{DN}$ of the lower part of the steering system 10, the torque $T_{ED}$ applied by the electric motor 24, the transmission ratio $i_{GR}$ between electric motor 24 and toothed rack 20, and the transmission ratio $i_{PN}$ of the first pinion 18.

The relevant parameters of the simplified physical equivalent model are, for the upper part of the steering system 10, the combined rigidity $c_{TB}$, the combined damping $b_{TB}$, the combined moment of inertia $J_{UP}$, the combined viscous friction $b_{UP}$, and the steering wheel torque $T_{DR}$.

The simplified physical equivalent model has two degrees of freedom, namely the position $s_{DN}$ of the toothed rack 20, and the position (rotational angle) PUP of the upper part of the steering system 10.

The position $s_{DN}$ of the toothed rack 20 is associated with a velocity $v_{DN}$ of the toothed rack 20.

An (angular) velocity $\Omega_{UP}$ is associated with the position (the rotational angle) $\varphi_{UP}$ of the upper part of the steering system 10.

Based on the above-described simplified physical equivalent model, a mathematical model of the controlled system 32 is created which describes the relationship between the degrees of freedom and the parameters of the simplified physical equivalent model.

The mathematical model is used for the design of the modification controller 34.

Figure 6:
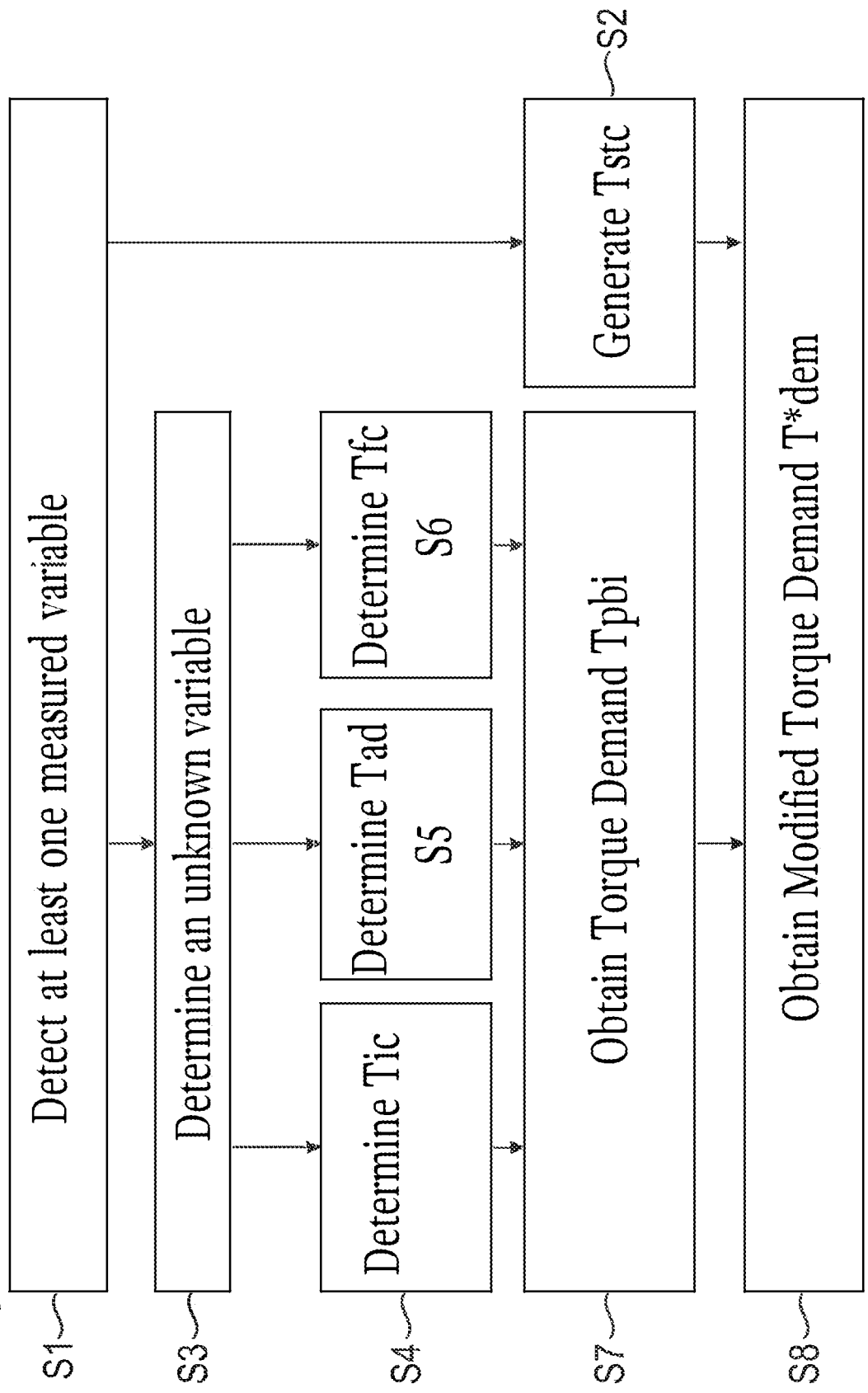
FIG. 6 shows a flow chart of a method according to the disclosure for modifying the mechanical behaviour of an electromechanically assisted steering system.

FIG. 6 shows a flow chart of the method for torque control.

At least one measured variable is detected by corresponding sensors of the controlled system 32 (step S1).

More precisely, an air gap torque $T_{AG}$ of the electric motor 24, a steering column torque $T_{TS}$, and the toothed rack position $s_{DN}$ are ascertained.

Phase currents of the electric motor 24 can be measured by sensors installed in the electric motor 24. The air gap torque $T_{AG}$ can be ascertained from these phase currents. The air gap torque $T_{AG}$ is a direct measure of the torque provided by the electric motor 24.

The steering column torque $T_{TS}$ can be measured by the torque and/or steering angle sensor 22.

Furthermore, the motor angle of the electric motor 24 can be measured by means of a corresponding sensor. The toothed rack position $s_{DN}$ can be ascertained from the measured motor angle.

By means of the steering feel controller 30, a torque demand $T_{STC}$ of the steering feel controller 30 is generated (step S2).

The torque demand $T_{STC}$ of the steering feel controller 30 is a torque to be provided by the electric motor 24.

The measured variables are provided to the modification controller 34, and one in exemplary arrangement, the Kalman filter 40.

Through use of the Kalman filter 40, based on the mathematical model of the controlled system 32 and based on the at least one measured variable, at least one unknown variable of the controlled system 32 is ascertained (step S3).

The at least one unknown variable comprises an acceleration $\dot{v}_{DN}$ of the toothed rack 20 and/or a velocity difference $\Delta\Omega = \Omega_{UP} - \Omega_{DN}$ between the upper part and the lower part of the steering system 10 and/or a friction force $F_{FR}$ on the lower part of the steering system.

The acceleration $\dot{v}_{DN}$ is passed on to the inertia compensation module 42. The velocity difference $\Delta\Omega$ is passed on to the damping module 44. The friction force $F_{FR}$ is passed on to the friction compensation module 46.

Based on the acceleration $\dot{v}_{DN}$, an inertia compensation torque $T_{IC}$ is ascertained (step S4) by the inertia compensation module 42.

Expressed in general terms, the goal of the inertia compensation module 42 is that the modified controlled system 36 behaves like the controlled system 32, but with modified (optimized) mass inertias.

For the design of the inertia compensation module 42, a desired mass $m_{DN,Des}=\delta_{Red}m_{DN}$ is therefore selected, wherein $\delta_{Red}$ is a freely selectable factor between 0 and 1.

The parameters of the inertia compensation module 42 are adapted so that the resulting modified controlled system 36 behaves as if it had the desired mass $m_{DN,Des}$.

The inertia compensation torque $T_{IC}$ is ascertained as the product of a linear or nonlinear transmission function $G_{IC}(s)$ and the acceleration $\dot{v}_{DN}$ of the toothed rack 20, thus according to the equation $T_{IC}=G_{IC}(s)\dot{v}_{DN}$.

Based on the velocity difference $\Delta\Omega$, a damping torque $T_{AD}$ is ascertained (step S5) by the damping module 44.

Expressed in general terms, the goal of the damping module 44 is an improved damping characteristic and a reduced tendency toward undesired oscillations in the modified controlled system 36. The damping properties are derived from the resonance behaviour of the controlled system 32.

In other words, the damping module 44 provides additional active damping via the damping torque $T_{AD}$.

The damping torque $T_{AD}$ is ascertained as a product of a linear or nonlinear transmission function $G_{AD}(s)$ and the velocity difference $\Delta\Omega$, thus according to the equation $T_{AD}=G_{AD}(s)\Delta\Omega$.

Based on the friction force $F_{FR}$ on the lower part of the steering system, a friction compensation torque $T_{FC}$ is ascertained (step S6) by the friction compensation module 46.

Expressed in general terms, the goal of the friction compensation module 46 is a linear steering behaviour and/or an improved roadway feedback.

The friction compensation torque $T_{FC}$ is then ascertained as the product of a linear or nonlinear transmission function and the friction force $T_{FC}$ on the lower part of the steering system, thus according to the equation $T_{FC}=G_{FC}(s) F_{FR}$.

The inertia compensation torque $T_{IC}$, the damping torque $T_{AD}$, and the friction compensation torque $T_{FC}$ are superimposed, by which a torque demand $T_{PBI}$ of the modification controller 34 is obtained (step S7).

The torque demand $T_{PBI}$ of the modification controller 34, thus the inertia compensation torque $T_{IC}$, the damping torque $T_{AD}$, and the friction compensation torque $T_{FC}$, is superimposed with the torque demand $T_{STC}$ of the steering feel controller 30, by which a modified torque demand $T_{DEM}^*$ is obtained (step S8).

The modified torque demand $T_{DEM}^*$ can be the manipulated variable.

The modified controlled system 36 has modified mechanical properties in relation to the controlled system 32, namely a reduced mass, an improved damping behaviour, and thus a lesser tendency toward undesired oscillations and improved friction properties.

The ascertained inertia compensation torque $T_{IC}$, the ascertained damping torque $T_{AD}$, and/or the ascertained friction compensation torque $T_{FC}$ already take into consideration the mechanical properties of the controlled system 32.

These mechanical properties therefore only still have to be taken into consideration to a reduced extent in the tuning of the steering feel controller 30. In particular, the tuning of the steering feel controller 30 can take place without consideration of these mechanical properties.

In other words, the above-described method provides more degrees of freedom in the setting of the steering wheel torque $T_{DR}$, thus more degrees of freedom in a parameterization of the steering feel controller 30.

The invention claimed is:

1. A method for modifying mechanical behaviour of an electromechanically assisted steering system of a motor vehicle using a model-based control approach, wherein the steering system has an electromechanical steering assistance having an electric motor, a steering feel controller, and at least one modification controller, wherein a torque to be applied by the electric motor is a manipulated variable, and wherein a controlled system and the modification controller jointly form a modified controlled system for the steering feel controller, having the following steps:
   providing the modified controlled system, wherein the modified controlled system imitates desired mechanical properties of the controlled system;
   detecting at least one measured variable of the controlled system by a sensor;
   ascertaining an inertia compensation torque and/or a damping torque and/or a friction compensation torque by the modification controller based on the at least one measured variable;
   generating a torque demand of the steering feel controller for the electric motor by operation of the at least one steering feel controller based on the at least one measured variable; and
   superimposing the torque demand of the steering feel controller with the inertia compensation torque and/or the damping torque and/or the friction compensation torque, by which a modified torque demand is obtained for the electric motor.

2. The method according to claim 1, wherein the desired mechanical properties comprise mass inertias, rigidities, and/or friction of the controlled system.

3. The method according to claim 1, wherein the at least one measured variable comprises phase currents of the electric motor, a steering column torque, and/or a motor angle of the electric motor.

4. The method according to claim 1, wherein the modification controller comprises a Kalman filter, wherein, based on the at least one measured variable, at least one unknown variable of the controlled system is ascertained by the Kalman filter, and wherein the inertia compensation torque and/or the damping torque and/or the friction compensation torque is/are ascertained based on the at least one unknown variable.

5. The method according to claim 4, wherein the unknown variable comprises an acceleration—of a toothed rack and/or a velocity difference between an upper part and a lower part of the steering system and/or a friction force on the lower part of the steering system.

6. The method according to claim 5, wherein the Kalman filter is designed based on a mathematical model of the controlled system.

7. The method according to claim 4 wherein the Kalman filter is designed based on a mathematical model of the controlled system.

8. The method according to claim 7, wherein the mathematical model is based on a physical equivalent model of the controlled system.

9. The method according to claim 8, wherein an inertia compensation module and/or a damping module and/or friction compensation module is ascertained based on the mathematical model of the controlled system.

10. The method according to claim 7 wherein an inertia compensation module and/or a damping module and/or friction compensation module is ascertained based on the mathematical model of the controlled system.

11. The method according to claim 10, wherein the inertia compensation torque is ascertained as a product of a linear nonlinear transmission function and an acceleration of a toothed rack and/or that the damping torque is ascertained as the product of a linear or nonlinear transmission function and a velocity difference between an upper part and a lower part of the steering system and/or that the friction compensation torque is ascertained as the product of a linear or nonlinear transmission function and a friction force on the lower part of the steering system.

12. A control unit for an electromechanically assisted steering system of a motor vehicle, wherein the steering system has the electromechanical steering assistance having the electric motor, the steering feel controller, and the at least one modification controller, wherein a torque to be applied by the electric motor is a manipulated variable, and wherein the controlled system and the modification controller jointly form the modified controlled system for the steering feel controller, wherein the control unit is designed to carry out a method according to claim 1.

13. An electromechanically assisted steering system, having a control unit according to claim 12 and the electromechanical steering assistance, which has the electric motor, the steering feel controller, and the at least one modification controller, wherein the torque to be applied by the electric motor is the manipulated variable, and wherein the controlled system and the modification controller jointly form the modified controlled system for the steering feel controller.

14. A computer program having a program code, which is designed to cause a steering system to carry out a method according to any one of claim 1 when the computer program is executed on a computing unit of the control unit of the steering system.

* * * * *